US010960376B2

(12) United States Patent
Strohmenger et al.

(10) Patent No.: US 10,960,376 B2
(45) Date of Patent: Mar. 30, 2021

(54) RECOMBINATOR

(71) Applicant: Hoppecke Batterien GmbH & Co. KG, Brilon (DE)

(72) Inventors: Philipp Strohmenger, Hoppecke (DE); Hugo Pack, Bontkirchen (DE); Alexander Rein, Giessen Rödgen (DE)

(73) Assignee: Hoppecke Batterien GmbH & Co. KG, Brilon (GB)

( * ) Notice: Subject to any disclaimer, the term of this patent is extended or adjusted under 35 U.S.C. 154(b) by 279 days.

(21) Appl. No.: 16/288,886

(22) Filed: Feb. 28, 2019

(65) Prior Publication Data

US 2019/0270063 A1 Sep. 5, 2019

(30) Foreign Application Priority Data

Mar. 1, 2018 (EP) .................................... 18159355

(51) Int. Cl.
  *B01J 10/00* (2006.01)
  *B01J 19/02* (2006.01)
  (Continued)

(52) U.S. Cl.
  CPC ........... *B01J 10/007* (2013.01); *B01J 12/007* (2013.01); *B01J 19/02* (2013.01); *C01B 5/00* (2013.01);
  (Continued)

(58) Field of Classification Search
  CPC .... H01M 10/52; H01M 10/523; B01J 10/007; B01J 12/007
  See application file for complete search history.

(56) References Cited

U.S. PATENT DOCUMENTS 3,832,238 A * 8/1974 Marui et al. .......... H01M 10/52
  429/86
4,048,387 A * 9/1977 Lahme ...................... C01B 5/00
  429/50
(Continued)

FOREIGN PATENT DOCUMENTS

EP 1780826 B1 7/2011
EP 1674424 B1 11/2011
  (Continued)

*Primary Examiner* — Matthew J Merkling
(74) *Attorney, Agent, or Firm* — Harness, Dickey & Pierce, P.L.C.

(57) ABSTRACT

A recombinator for the catalytic recombination of hydrogen and oxygen generated in energy converters, in particular accumulators, to form water, comprising a housing in which a volume space is formed, into which the gases can flow via an opening and in which a recombination device is arranged that comprises a portion for a catalyst material and a portion for an absorption material, wherein the flow path of the gases to be recombined extends through the portion comprising the absorption material into the portion comprising the catalyst material, wherein a distance space is formed between the portion comprising the absorption material and the portion comprising the catalyst material, wherein the catalyst material is configured as a catalyst bar, the catalyst bar is arranged in a first gas-permeable tube and the distance space is formed in a gap space between the inner walling of the first gas-permeable tube and the outer wall of the catalyst bar.

7 Claims, 3 Drawing Sheets

(51) Int. Cl.
  *H01M 10/52*   (2006.01)
  *H01M 8/02*    (2016.01)
  *B01J 12/00*   (2006.01)
  *H01M 8/0252*  (2016.01)
  *C01B 5/00*    (2006.01)
  *H01M 8/0236*  (2016.01)

(52) U.S. Cl.
  CPC ............ *H01M 8/02* (2013.01); *H01M 8/0236* (2013.01); *H01M 8/0252* (2013.01); *H01M 10/523* (2013.01); *B01J 2219/0263* (2013.01)

(56) References Cited

U.S. PATENT DOCUMENTS

| | | | | |
|---|---|---|---|---|
| 5,162,169 | A * | 11/1992 | Tomantschger | H01M 4/02 429/59 |
| 6,254,841 | B1 * | 7/2001 | Kesper | H01M 50/394 422/211 |
| 6,562,517 | B1 * | 5/2003 | Misra | H01M 50/383 429/225 |
| 6,660,425 | B2 * | 12/2003 | Jones | H01M 10/44 429/53 |
| 2001/0049051 | A1 * | 12/2001 | Jones | H01M 10/52 429/86 |
| 2004/0126647 | A1 * | 7/2004 | Jones | H01M 10/52 429/57 |
| 2008/0166275 | A1 * | 7/2008 | Riegel | H01M 8/0662 422/614 |
| 2019/0140326 | A1 * | 5/2019 | Kobayashi | H01M 10/121 |

FOREIGN PATENT DOCUMENTS

| | | |
|---|---|---|
| EP | 1807191 B1 | 1/2017 |
| GB | 1405980 A1 | 4/2004 |
| JP | H1194992 A | 4/1999 |

* cited by examiner

RECOMBINATOR

The invention relates to a recombinator for the catalytic recombination of hydrogen and oxygen generated in energy converters, in particular accumulators, to form water, comprising a housing in which a volume space is formed, into which the gases can flow via an opening and in which a recombination device is arranged that comprises a portion for a catalyst material and a portion for an absorption material, wherein the flow path of the gases to be recombined extends through the portion comprising the absorption material into the portion comprising the catalyst material, wherein a distance space is formed between the portion comprising the absorption material and the portion comprising the catalyst material.

Recombinators as well as recombination devices are well known by themselves from the state of the art, such as for example from EP 1 807 191 B1, EP 1 780 826 B1 and EP 1 674 424 B1.

Furthermore, a recombination device is known from GB 1 405 980 A, which recombination device comprises a closed hollow housing, within which a decontaminating cell and a catalyst cell are arranged. These two cells are in fluidic connection via a first pipeline and a second pipeline with the inner space of an accumulator. Herein, the decontaminating cell serves to purify a gas that has been introduced into the housing and to remove toxic components from it, wherein in particular carbon monoxide, arsenic hydride and antimony hydride shall be absorbed.

JP H11 94992 A1 discloses an arrangement of a flue gas discharge comprising a catalyst and a iodine filter. Herein, the iodine filter serves to minimize a performance reduction of the catalyst caused by iodine, which simultaneously leads to a blending in the reactor vessel with the consequence of reducing the concentration of combustible gas.

A recombinator of the initially mentioned type comprises a recombination device and a housing. In the finally assembled condition the recombination device is arranged inside the housing, i.e. the volume space provided by the housing accommodates the recombination device.

Typically, the housing is designed gas-tight, such that gases flowing into the recombinator cannot leak in an undesired manner into the atmosphere surrounding the recombinator.

The recombination device that is received by the housing of a recombinator in the finally assembled condition comprises a catalyst as core piece. Over all platinum metals are known as catalysts, in particular palladium that is applied in the form of a thin layer on a carrier bar which can be for example made of copper, alumina or the like. The catalyst bar formed in this manner is centrically inserted into a tube made of porous material, for example a gas permeable ceramic tube, wherein the free annular space that remains in the tube between the catalyst bar and the inner surface of the tube is filled with an absorption material. Lead oxides, silver oxides, iron oxides, copper oxides, aluminium oxides, manganese oxides or the like come into question as absorption material. The tube that receives the catalyst bar and the absorption material is usually arranged in a detached manner inside the gas-tight housing, wherein the housing typically comprises a connecting piece for the connection to an energy converter, such as for example an accumulator, which connecting piece serves for a gas supply, on the one hand, and a water discharge, on the other hand.

The gases hydrogen and oxygen that are generated during the normal operation of for example an accumulator equipped with a recombinator, especially during a charging operation, will be introduced via the connecting piece of the recombinator into the housing, i.e. the volume space provided by the housing, will pass through the porous tube and the absorption material and will then be recombined to water at the catalyst. The recombination reaction is exothermal, for which reason the water that has been recombined at the catalyst is present in the form of water vapour. The water vapour generated at the catalyst then deposits on the inner wall of the housing, condenses and flows back into the accumulator via the connecting piece provided for this purpose.

The advantage related to the use of a recombinator of the above described type is obvious. The gases hydrogen and oxygen that are set free during the operation of an accumulator are recombined to water by means of the recombinator, which water will not be lost for the accumulator, but will flow back into the electrolyte of the accumulator. It is thus not required to refill distilled water into the electrolyte of the accumulator. In so far an accumulator that is equipped with one or more recombinators depending on its size proves to be maintainance-free.

Depending on the construction form and size of the accumulator or in dependence on the space that is available, the recombinator can be designed such that it is oriented perpendicularly or longitudinally with respect to the top side of the accumulator.

Although recombinators of the above described construction form have proved to be successful in the everyday practical use, there is a need for improvement. Thus, it has been found that even if an accumulator is operated appropriately, such amounts of hydrogen and oxygen can be generated that the recombination device can be overheated due to the recombination of the high amount of gas to be recombined in the recombinator. In the worst case such an overheating can lead to a destruction of the recombination device.

But even if the individual components of the recombination device are dimensioned with respect to each other such that an overload protection is in so far obtained as a too high recombination power is excluded, it is possible in case of too much gas flowing into the volume space provided by the housing that the recombination device will be heated such that the absorption material that surrounds the catalyst bar will be damaged in an irreparable manner. In case of thermal stress of the recombinator, especially the absorber, i.e. the absorption material that surrounds the catalyst bar, is endangered, since this one has hydrophobic properties which will be lost due to an excessive thermal load, whereby the absorber will lose its intended purpose, which will render the recombination device unusable in the worst case, depending on the thermal damage.

A new proposal for solving this problem is providing a separation device which divides the volume space provided by the housing into a first compartment and into a second compartment which is in fluidic connection with the first one, wherein the first compartment at least partially receives the recombination device. This additional housing of the recombination device has the advantage that two partial volumes that are fluidically coupled to each other are formed inside the volume space provided by the housing, whereby a dynamic balance between the water vapour set free at the recombination device, on the one hand, and the gas flowing into the housing, on the other hand, will be enabled in case of operation. In practice it has been found that the structure is complex and expensive.

Based upon the above described facts, it is the object of the invention to improve a recombinator of the initially mentioned type, such that a reliable recombination output is assured also in case of higher amounts of supplied gas.

For achieving this aim, the invention proposes a recombinator comprising the features of claim 1, according to which a recombinator of the initially mentioned type is provided which is characterized in that the catalyst material is configured as a catalyst bar, that the catalyst bar is arranged in a first gas-permeable tube and that the distance space is formed in a gap space between the inner walling of the first gas-permeable tube and the outer wall of the catalyst bar. Other advantages and features will become apparent in the sub-claims.

Since according to the state of the art the absorption material is placed such that it directly surrounds the catalyst, a heating-up in the catalyst area due to the exothermal operation has a direct effect on the absorption material and thus also on the efficiency of this one. Thanks to the configuration according to the invention of the recombinator, a distance space is formed between the portion comprising the absorption material and the portion comprising the catalyst material. The invention thus proposes to space the catalyst which provides the catalyst material and the absorber which provides the absorption material from each other while leaving a distance space between them. In contrast to the state of the art, no tight packing, i.e. no direct juxtaposition of catalyst material, on the one hand, and absorption material, on the other hand, is provided.

This purely atmospherically filled distance space causes a separation between the catalyst surface and the absorption material, such that the effects of the temperature rise onto the absorption material will be highly limited. Thanks to this spaced arrangement it is achieved that in the intended recombination case a too strong heat impact on the absorber, i.e. the absorption material will be prevented. It is thus assured that the material properties of the absorption material will not be adversely affected due to an excessive heat impact and the efficiency of the recombination will not be compromised.

Advantageously, the catalyst material is configured as a catalyst bar and is essentially arranged in a centric manner in a gas-permeable tube. This first gas-permeable tube offers an essentially cylindrical interior space, completely independent from the other cross section thereof. If the catalyst bar is inserted, this inner space forms a hollow cylindrical gap or annular space which is not filled with absorption material. The cross section of this gap space depends on the cross section of the gas-permeable tube that is advantageously made of a porous ceramic material.

In the present invention the gas space will be called distance space, since it defines a distance between the catalyst material, on the one hand, and the absorption material, on the other hand.

The combination of the catalyst bar and the first gas-permeable tube with the distance space formed therebetween represents a first module which is, according to an advantageous proposal of the invention, surrounded by a second gas-permeable tube, at least in the area where the catalyst bar and the first gas-permeable tube overlap each other. The second gas-permeable tube comprises an inner diameter which is greater than the outer diameter of the first gas-permeable tube, such that here the gap or annular space is formed. This gap space is provided for receiving the absorption material.

A sealing of the gap space is provided at the upper and lower opening of the gap space in the area of the edges of the second gas-permeable tube, such that the gap space is not open towards the outer atmosphere.

The first gas-permeable tube comprises an inner diameter which is greater than the outer diameter of a catalyst bar. This defines the distance space which is not filled with absorption material.

In the sense of the invention the terms tube and inner diameter do not necessarily mean that circular or cylindrical geometries are involved. It is also possible to use angular geometries, both for the catalyst bar and for the tubes or for individual elements of the entire module.

According to an alternative of the invention, the catalyst can also be formed as a fill. In this case it is preferred to use a bar-shaped sleeve-body which accommodates catalyst material in the form of a fill made of, for example, a granulate or the like. According to this embodiment, the catalyst bar is formed by the sleeve-body filled with a fill. Herein, the sleeve-body is defined by a first gas-permeable tube that receives the catalyst material in the form of a fill. The sleeve-body is closed by a plug on both sides, such that the catalyst material fill is accommodated in a position-stable manner inside the sleeve-body.

The grain size of the fill providing the catalyst material can vary depending on the application case, up to a powdery granulate. Herein it is provided that the catalytically acting fill is formed by a granulate, the core of which consists of a porous ball material, the outer surface of which is coated, namely with a catalytically acting material, such as for example palladium. According to a variation it can be provided that the fill of catalyst granulate is mixed with a fill of filling material. In this manner the catalyst fill is composed of two granulate fills, wherein only one of the two has a catalytic effect.

The configuration of the catalyst in the form of a fill has the effect that in dependence of the fill a filling interspace is formed between the individual particles of the fill, which filling interspaces form in total the distance space according to the invention. Herein, the size of the distance space is dependent on the grain size of the fill. The coarser the fill size is, the greater is the obtained distance space or vice versa the finer the fill is, the smaller is the distance space.

Alternatively or complementarily it can be provided to arrange the catalyst provided in the form of a fill inside a first gas-permeable tube while leaving an annular gap space. In this case, a sleeve-shaped body which belongs to the catalyst and has the form for example a gas-permeable tube which receives the catalyst fill is provided. The catalyst is surrounded by a first gas-permeable tube while leaving an annular gap space. This first gas-permeable tube is surrounded by a second gas-permeable tube, wherein the annular space between the first and the second gas-permeable tube is filled up with absorption material.

According to this embodiment, the distance space according to the invention is formed by the annular space between the catalyst and the first gas-permeable tube, on the one hand, and the interspaces formed due to the filling between the individual particles of the fill, on the other hand.

According to the invention, the separation between the surface of the catalyst bar, on the one hand, and the absorption material, on the other hand, by means of the sleeve-like interleaving of the gas-permeable elements, preferably tubes made of porous ceramic, is essential. This has the effect that the exothermal process taking place on the catalyst surfaces has no direct impact on the absorption material.

According to another advantageous proposal, the gas-permeable tubes comprise different wall thicknesses. These ones can be dimensioned and adapted in dependence on the capacity and the amount of gases to be combined, wherein each one of the gas-permeable tubes can be provided with a higher or smaller wall thickness with respect to the other one.

According to another feature of the invention it is provided that the housing comprises a holder for receiving the recombination device on one side. This holder can be preferably a pipe socket which unilaterally receives the recombination device which is preferably shaped as a bar. Herein, the holder rests upon the base of the housing, whereby an overall safe arrangement of the recombination device is obtained.

According to another feature of the invention, the pipe socket that receives the recombination device can be closed off at one end by means of a screen that is formed as a perforated disc. According to this construction, the recombination device projects through the opening of the perforated disc which serves as a screen, wherein the perforated disc in turn rests upon the pipe socket that receives the recombination device. Thus, a position-safe arrangement and orientation of the individual structural components of the recombinator according to the invention with respect to each other are assured.

FIGURES

Other features and advantages of the invention will become apparent in the following description of the figures. Herein:

DESCRIPTION

Figure 1:
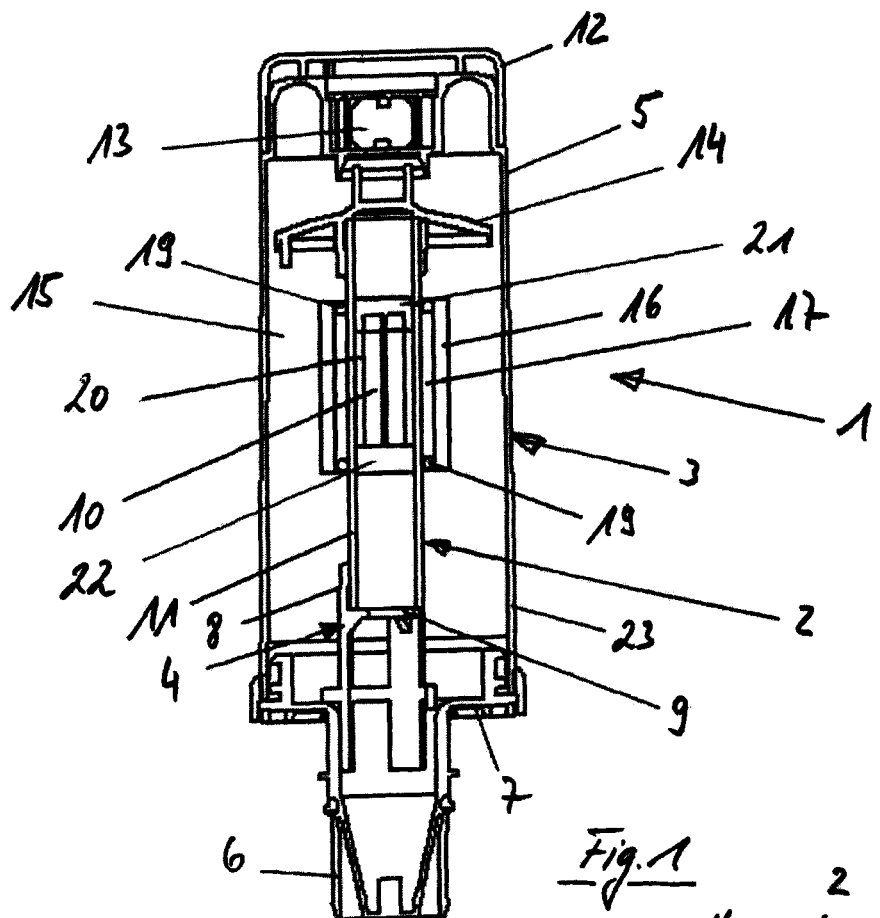
FIG. 1 is a purely schematic representation of a recombinator of the type according to the invention according to a first embodiment.

FIG. 1 shows a schematic representation of a recombinator 1 according to the invention in a so-called vertical orientation, i.e. with a standing recombination device 2.

The recombinator 1, as it is known by itself, comprises a recombination device 2 and a gas-tight housing 3 that provides a volume space 15 and accommodates the recombination device 2.

The recombination device 2 is bar-shaped and comprises a catalyst bar 10 which is arranged inside a ceramic tube 11. With respect to the sheet plane according to FIG. 1, the catalyst bar 10 is supported by an upper holder 21 and a lower holder 22, which in turn rest upon the inner side of the ceramic tube 11. The free gap or annular space 20 between the catalyst bar 10 and the inner surface of the ceramic tube 11 is only atmospherically filled and does thus especially not contain any absorption material. Thanks to this spaced arrangement a distance space 20 is created.

The housing 3 comprises a base 4 and a gas-tight hood 5 which is arranged thereon. In the finally assembled state, the hood 5 will be supported by the base 4.

The base 4, on his part, provides a connecting piece 6 as well as an aerosol separator 7. Herein, the connecting piece 6 serves for a fluidic connection of the recombinator 1 to a not further represented accumulator. In the intended case of use gas to be recombined can be transferred via the connecting piece 6 from the accumulator into the recombinator 1 or water that has been generated due to a recombination can be transferred from the recombinator 1 into the accumulator.

Furthermore, the base 4 supports a holder 8 in the form of a pipe socket which serves for receiving the recombination device 2 at one end side.

In the shown exemplary embodiment the hood 5 is designed as a two-piece component and comprises a hood wall 23, on the one hand, and a hood cover 12, on the other hand. Alternatively to this embodiment, a one-piece design of the hood 5 can also be provided.

Furthermore, the recombinator 1 comprises a module 13 shown in the exemplary embodiment and formed between the recombination device 2 and the hood cover 12, which module 13 can comprise, in a manner known per se, an ignition reverse arrangement, for example in the form of a frit and a valve arrangement, which valve arrangement can for example comprise an overpressure valve and/or a vacuum valve, such that in case of need a pressure compensation by means of the atmosphere surrounding the recombinator 1 can take place.

In the shown exemplary embodiment the catalyst bar 10 is arranged inside a first gas-permeable tube 11. For this purpose, the first gas-permeable tube 11 is inserted into the holder 8 in the area of the base 4 in the shown exemplary embodiment.

A second gas-permeable tube 16 receives the module composed of the catalyst bar 10 and the first gas-permeable tube 11 while being arranged around it. Sealings 19 are provided with respect to the first gas-permeable tube 11, which sealings 19 are arranged between the first gas-permeable tube 11, on the one hand, and the second gas-permeable tube 16, on the other hand. These sealings 19 furthermore limit the gap or annular space 17 formed between the two tubes. Herein, this gap space 17 forming an absorber serves to receive an absorption material, also in a pourable form, since the sealings 19 serve as barriers against falling out.

In a known manner, the hood cover 12 is provided with the module 13 known by itself. A condensation roof 14 is placed above the catalyst bar 10 and configured as upper holder of the first gas-permeable tube 11 in the shown exemplary embodiment.

The gas flowing via the connecting piece 6 into the volume space 15 at first passes the second gas-permeable tube 16 in order to get into contact with the absorption material in the gap space 17. Then, the gas continues to flow through the first gas-permeable tube towards the catalyst bar 10. The generated water vapour flows in the opposite direction and precipitates in a condensing manner on the hood 5. Herein, the condensation roof 14 serves for protecting the recombination device 2, especially the catalyst bar 10, against an undesired seepage due to the water that has condensed on the hood cover 12 and is dripping down. The water generated by means of recombination finally leaves the recombinator 1 via the aerosol separator 7.

It is of essential importance for the invention to provide the distance space 20, by means of which the absorption material that forms the absorber is spaced from the catalyst bar 10 with interposition of the ceramic tube 11. Thanks to this design it is assured that the catalyst bar 10 and the absorber are thermally decoupled from each other, such that a too strong impact of the heat that is generated at the catalyst bar 10 during operation will be avoided. This advantageously leads to a higher longevity of the absorber and thus also of the recombination device 2.

Figure 2:
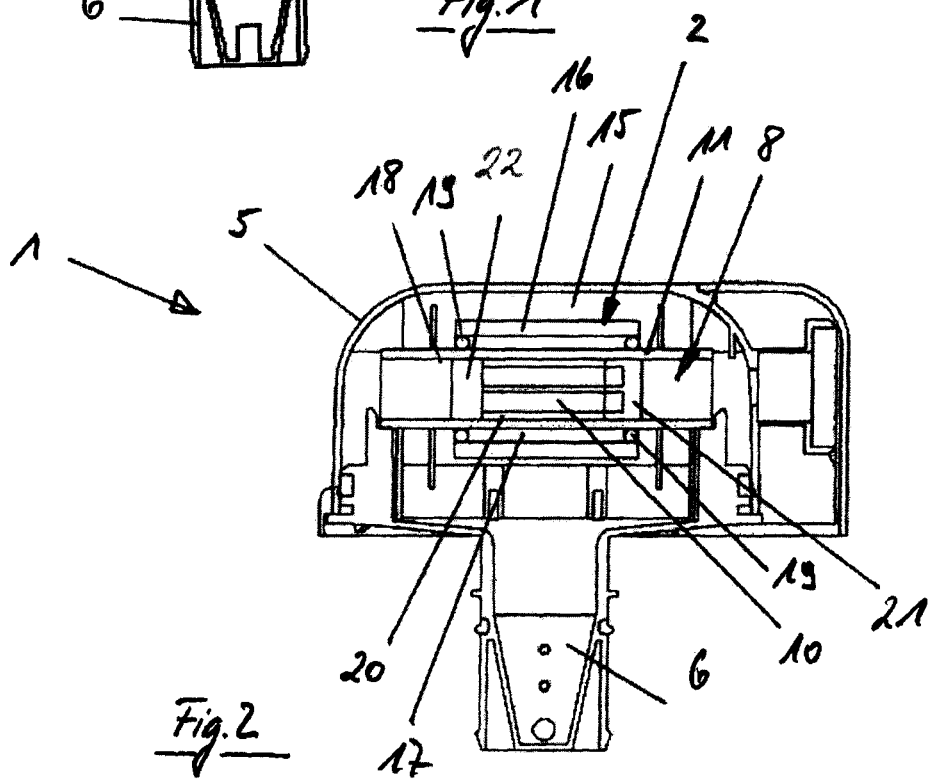
FIG. 2 is a purely schematic representation of a recombinator of the type according to the invention according to a second embodiment.

FIG. 2 shows an alternative embodiment of the invention, wherein this embodiment concerns a so-called lying arrangement, which means a horizontally oriented arrangement of the recombination device 2. Otherwise, the structure and the functioning of the recombinator 1 shown in FIG. 2 correspond to the ones of the recombinator 1 according to FIG. 1.

Here, the catalyst bar 10 as well as the two essentially concentric gas-permeable tubes 11 and 16 are essentially arranged parallel to the surface of a not shown accumulator or other energy converter. In this case a supporting sleeve 18 assures that the essentially horizontal orientation remains in position.

In the case of the exemplary embodiment according to FIG. 1 the recombination device 2 is standing essentially perpendicularly with respect to the surface of an accumulator, such that here corresponding displacements do not have to be expected.

For the purpose of a horizontal orientation of the recombination device 2, the holder 8 which supports the recombination device 2, is made in two pieces, wherein a first piece is provided at the one end and another piece is provided at the other end of the recombination device 2 for supporting the same one.

Figure 3:
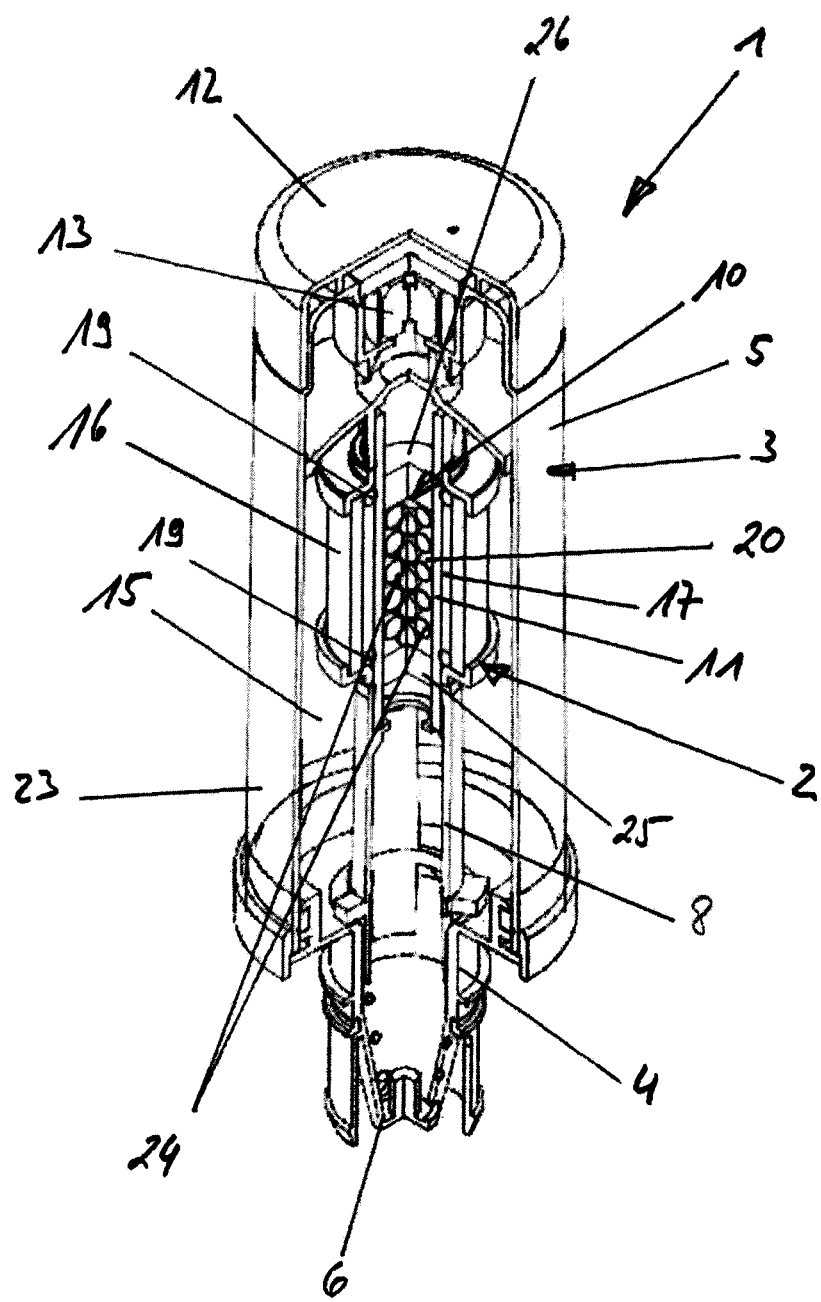
FIG. 3 is a cut perspective view of a recombinator according to a first preferred embodiment.
Figure 4:
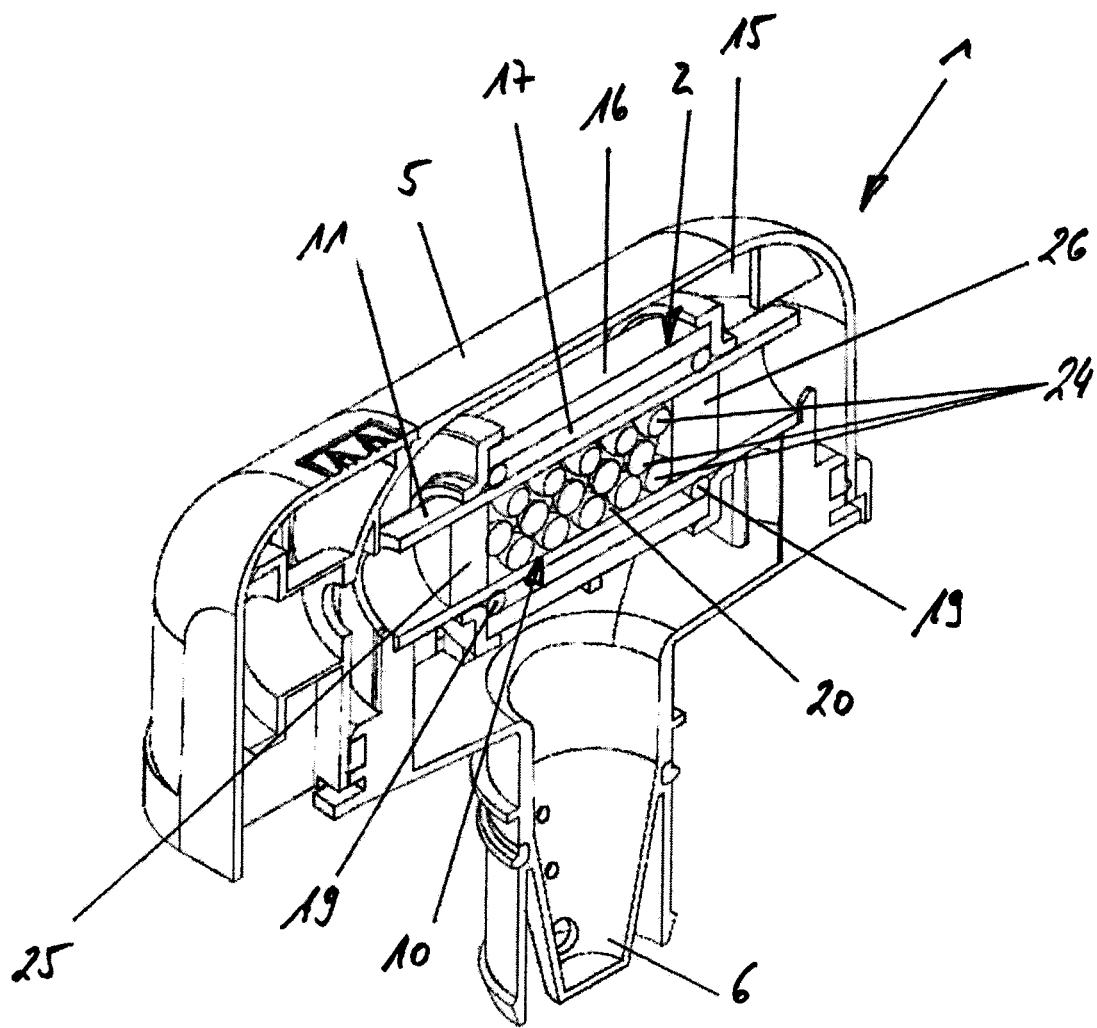
FIG. 4 is a cut perspective view of a recombinator according to a second preferred embodiment.

FIGS. 3 and 4 respectively show a preferred embodiment of the invention, wherein FIG. 3 shows a so-called vertical orientation and FIG. 4 shows a so-called horizontal orientation.

Both embodiments according to FIG. 3 or according to FIG. 4 have in common that the catalyst 10 is configured as a fill. Herein, the gas-permeable tube 11 serves as a sleeve-body for receiving the catalyst fill. In the shown exemplary embodiment the catalyst fill is a granulate composed of spherical grains 24 which are accommodated by the inner space enclosed by the tube 11. For closing the tube 11 at the ends plugs 25 and 26 are used, between which two plugs 25 and 26 the catalyst fill is arranged in a position-safe manner.

The granulate grains 24 of the catalyst fill lie next to each other while respectively forming an interspace, wherein these interspaces in total provide the distance space 20. Alternatively or in addition to this it can be provided that the fill is spaced from the gas-permeable tube 11 while leaving an annular space, in which case the distance space 20 is then formed by the interspaces between the granulate grains and by the annular space.

What is claimed is:

1. A recombinator for the catalytic recombination of hydrogen and oxygen generated in energy converters, in particular accumulators, to form water, comprising a housing in which a volume space is formed, into which the gases can flow via an opening and in which a recombination device is arranged that comprises a portion comprising a catalyst material and a portion comprising an absorption material, wherein the flow path of the gases to be recombined extends through the portion comprising the absorption material into the portion comprising the catalyst material, wherein a distance space is formed between the portion comprising the absorption material and the portion comprising the catalyst material, wherein the catalyst material is configured as a catalyst bar, that the catalyst bar is arranged in a first gas-permeable tube and that the distance space is formed in a gap space between an inner wall of the first gas-permeable tube and an outer wall of the catalyst bar.

2. A recombinator according to claim 1, wherein the module formed by the catalyst bar, the distance space and the first gas-permeable tube is surrounded by another second gas-permeable tube while leaving a gap space which receives the absorption material.

3. A recombinator according to claim 2, wherein the gas-permeable tubes are made of porous ceramic.

4. A recombinator according to claim 2, wherein the gap space which receives the absorption material is configured to be hollow cylindrical and is sealed at the end edges.

5. A recombinator according to claim 2, wherein the second gas-permeable tube comprises a greater wall thickness than the one of the first gas-permeable tube.

6. A recombinator according to claim 1, further including a holder for receiving the recombination device on the side of one end.

7. A recombinator according to claim 6, wherein the holder is a pipe socket.

* * * * *